March 4, 1952 — W. A. WEBB — 2,587,939
FOOD PROCESSING APPARATUS
Original Filed April 17, 1942
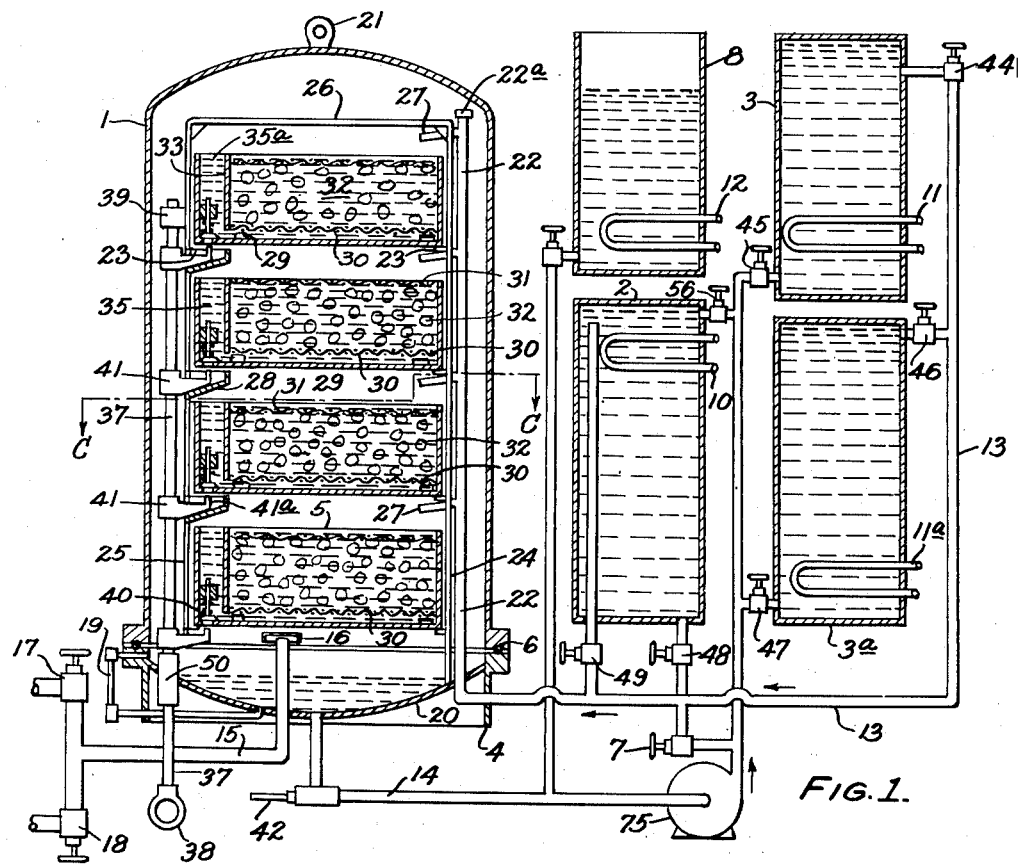
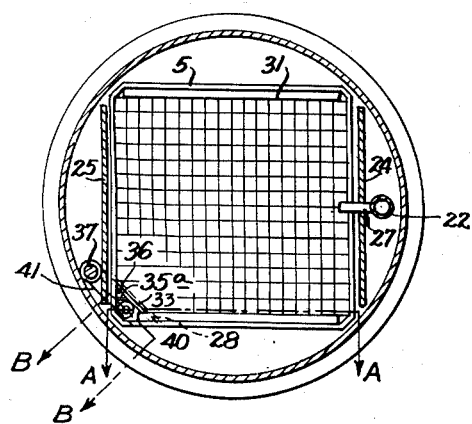
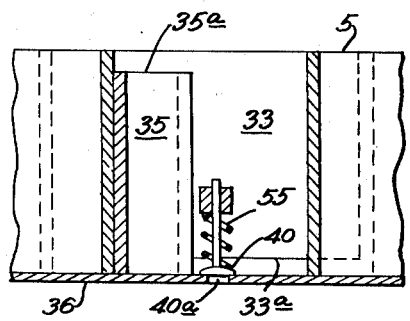
INVENTOR.
WELLS ALAN WEBB
BY
Boyken, Mohler & Beckley
ATTORNEYS Patented Mar. 4, 1952

2,587,939

UNITED STATES PATENT OFFICE 2,587,939

FOOD PROCESSING APPARATUS

Wells Alan Webb, San Jose, Calif.

Original application April 17, 1942, Serial No. 439,384. Divided and this application August 6, 1947, Serial No. 766,509

4 Claims. (Cl. 99—239)

The present invention relates to apparatus capable of rendering certain food substances porous and rigid by dehydration in liquid media and impregnating the pores of rigid food substances with a gas or a liquid to produce edible products suitable for incorporation into confections, cakes, ices and like products.

The present invention is a division of my copending patent application Serial No. 439,384, filed April 17, 1942, under the title "Preparation of Food Compositions," now abandoned; this invention is also a division of my application filed February 25, 1939, Serial No. 258,482, now Patent No. 2,283,302, under the title "Food Compositions and Means for the Preparation Thereof."

It is an object of the present invention to provide means whereby fruits and other foods may be dehydrated and puffed in vacuum.

It is a further object of the invention to provide means for cooling the puffed fruit while preserving the puffed structure.

Another object of the invention is to provide means for contacting fruits and other foods with a dehydrating liquid that circulates between the food and selective temperature-controlling surfaces.

Another object of the invention is to provide means by which the moisture absorbing capacity of dehydrated porous foods may be reduced or eliminated.

Another object of the invention is to provide means by which liquid fats or other fluids may be injected into the pores and cells of puffed fruits, puffed grains and other food articles, thereby to increase the nutritional content of said foods.

Another object of the invention is to provide means to cover the outer surfaces of particles of dehydrated fruit with a protective medium, thereby to reduce absorption of moisture and adhesion of adjacent particles to one another.

The invention has other objects which with the foregoing will be set for with the description of the preferred forms of the invention. It is to be understood, however, that I do not limit myself to said description, as I may adopt variations from said forms within the scope of the invention as set forth in the claims.

In my Patent No. 2,110,184, issued March 8, 1938, I disclosed a method for puffing and dehydrating fruit whereby crisp, distended whole pieces or particles of fruit may be produced. Fruit produced by said method is often unevenly dried owing to failure of heat rays to reach hidden particles, for dehydration takes place in a vacuum with no means other than radiation and conduction of heat through layers of fruit whereby heat may reach the said hidden particles. Thus the surfaces of fruit which were directly exposed to the heat waves emanating from the heated steam coils of my former invention were liable to overheating or charring, whereas simultaneously the hidden portions were subject to insufficient heating. These limitations made it impossible to dehydrate batches of fruit in deep layers successfully. A more expensive method was used by which the fruit was spread out thinly so that as large a portion as possible could be directly exposed to the radiating surfaces in order that the fruit might become satisfactorily dehydrated throughout.

I have now found that with the aid of a liquid medium and reduced pressure, fruit or other food may be rapidly and satisfactorily dehydrated in deep layers and under reduced pressure without causing substantial decomposition of the fruit sugar. By my new method, heat is applied to all portions of the food by means of a heated liquid such as an edible fat, glycerine or other suitable means. The liquid medium is cycled successively through an external heater, and through the food being dehydrated. The external heater may include a still or settling tank to remove water contained in said liquid medium.

I have also found that fruit, or other food, may be puffed without interrupting and thus lengthening the drying period through the temporary increase in pressure that was necessary by my former process. To accomplish puffing during some portion of the drying period, I now momentarily increase the temperature of the liquid medium flowing over the food. By raising the temperature of the liquid medium, I cause the rate of evaporation of moisture from within the food to increase to such an extent that the vapors inflate or puff the particles of food in the course of their escape therefrom. During this step the vapor pressure within the processing chamber may remain at a practically constant reduced value which is substantially less than the vapor pressure of the heated fruit, and drying will therefore continue without interruption through every phase of the puffing operation.

The presence of a circulating liquid medium in contact with the food has the further advantage that, following puffing and dehydration, the food may be rapidly and completely cooled by quickly lowering the temperature of the circulating liquid medium.

The initial operations of my new process comprise therefore, the steps of partially dehydrating a food in contact with a circulating liquid medium and under reduced pressure, puffing the food under a constant reduced pressure by increasing the temperature of the liquid medium and continuing the dehydration until the food is substantially dry.

If at the termination of the last mentioned stage of dehydration, the liquid medium is cooled and then drained away from the food prior to the restoration of normal pressure to the inside of the drying chamber, then such restoration of pressure will drive air or other gas into the expanded cells and pores of the food. The product resulting from such a sequence of operations is a puffed food containing air in its pores and carrying on its exterior a thin coating of the liquid medium. This coating may be beneficial: for example, particles of fruit puffed in the above described manner by means of a liquid fat are delivered from the puffing process with a protective coating of the fat. This coating not only increases the nutritional value of the fruit, but it also retards absorption of moisture from the atmosphere, and materially reduces the tendency of adjacent particles to "cake" or stick together. The thickness of this protective coating is increased by lowering the temperature of the fat in contact with the fruit just prior to draining the fat away.

The termination of the last stage of dehydration may, on the other hand, be characterized by the continued presence of the cooled circulating liquid about and over the food. In such case, restoration of normal pressure serves to drive the liquid into the cells and pores of the food. The result is the full-cell impregnation of the food. For example, the cells of fruit particles puffed and dehydrated in contact with a fat become filled with fat if normal pressure is restored while the fruit remains submerged.

While I prefer to carry out my process in an apparatus of the form shown in the accompanying drawing, which is a part of the specification of the present invention, it is to be understood that the particular form of apparatus shown is but an example of one means by which the invention may be practiced. With reference to the drawing:

Fig. 1 shows the general arrangement of apparatus with vessels shown in vertical half section, and the trays shown in section A—A of Fig. 2.

Fig. 2 is a plan view of the processing chamber taken through section C—C of Fig. 1.

Fig. 3 is a view of one of the trays taken through section B—B of Fig. 2.

With reference to Fig. 1, the processing chamber is composed in part of cover or vessel 1, base 4, and food receptacles or trays 5. The processing chamber is connected by conduit means of inlet pipe 13 and outlet pipe 14 to cooling chamber 2, heating chambers 3 and 3a and supply tank 8. A vacuum line 15 extends into the base of the processing chamber and serves to connect through valve 17 with a vacuum pump or other exhaust means. Cap 16 prevents splashes of oil from entering the vacuum line. By means of hook 21, cover 1 may be lifted from base 4 to allow the trays of fruit to be removed. The parting between cover 1 and base 4 occurs at a sealing junction 6. Trays 5 are supported on brackets 23 attached to upright panels 24 and 25. Panels 24 and 25 are attached at their lower end to bottom 20 of base 4 and at their upper end, the two panels are fastened to each other by means of cross brace 26.

A manifold 22 connects with the inlet pipe 13 and extends upwardly through the processing chamber. Outlets are provided in the manifold at locations suitable for the discharge of liquid into the trays. Liquid from outlets 27 passes through the trays and is discharged from the right-hand side of the trays into troughs 28. From 28, the liquid passes through suitable openings in panel 25 and drops to base 4 where it collects in bottom 20 and passes out through pipe 14. A liquid level gage 19 indicates the level of liquid remaining in bottom 20.

The trays 5 containing the food to be dehydrated are of special construction to permit proper circulation of the liquid through the food, and to permit the liquid to be drained from the food before the trays are removed from the processing chamber. Each of the trays contains a grid 29 on which is laid a screen 30 to hold the food 32. Over the food is a second screen 31 fastened to the tray by a bracket that permits the screen to be removed when the food is to be dumped. Screen 31 serves to hold the food submerged in the heating liquid. Attached to one corner of the tray is a baffle 33 that permits liquid to pass from the tray into the corner space only by way of a low level opening formed between the bottom edge 33a of baffle 33 and the floor of the tray. Another baffle 35 is arranged in the corner space, which permits only the upper level of liquid in the corner space to pass out of the tray and into trough 28 by way of passageway 36. This combination of baffles and passageways serves to drain from the bottom of the tray the cooler liquid that settles to the level of 33a, and simultaneously to maintain the liquid level above screen 31 by causing it to flow over the upper edge 35a of baffle 35.

When it is desired to drain substantially all of the liquid from the trays, a valve mechanism is utilized. This mechanism is constructed as follows: A rod 37 having a handle 38, a gland 50 and bearing 39 are provided. Rigidly mounted on rod 37 and engaging with valves 40 are tappets 41.

An upward push on handle 38 causes the ends 41a of tappets 41 to engage and raise valves 40, so permitting liquid from the trays to drain into troughs 28. A downward pull on the handle lowers the tappets and allows the valves to close under the impulse of valve springs 55. Gland 50 prevents leakage of air into the chamber.

Chambers 2, 3, 3a, and 8 are provided with heat transfer coils 10, 11, 11a and 12 respectively.

I shall now describe a typical application of my new process making use of the preferred form of apparatus as described in the preceding paragraphs. For example: By means of fluid of suitable temperature flowing through the heat transfer coils for the respective chambers, the liquids in chambers 3 and 8 are maintained at from 70° C. to 100° C., the liquid in chamber 3a is maintained at from 100° C. to 125° C., and the liquid in chamber 2 is maintained below 60° C. Sun dried apples containing about 20% moisture are cut into particles and placed in the trays, screens 31 are placed over the fruit, the trays are slid on the racks into the processing chamber, and cover 1 is lowered to form a seal. Thereupon the chamber is evacuated to about 29.5 inches of mercury, based on the 30 inch barometer, by evacuating means connected to valve 17. Fat at 70° C. to 100° C. from heater 3 passes through valve 44 and is circulated approximately ten minutes through pipe 13, manifold 22, out orifices 27 and through the fruit by means of pump 75. Evaporation of moisture takes place: the vapor rises through screens 31 and is drawn off through pipe 15. Cool fat from the bottom of the trays overflows baffle 35 and passes to the bottom of the chamber to be recirculated by pump 75 through heater 3. Thermometer 42 indicates the temperature of the outgoing liquid. A similar thermometer may be installed on pipe 13 to indicate the temperature of the incoming liquid. The temperature of the fruit may be recorded by inserting suitable wire thermocouples into particles of fruit and leading the wires to a potentiometer outside of the chamber.

To complete the dehydration and to puff the apples, valves 44 and 45 are closed, and valves 46 and 47 are opened to permit fat at a temperature of from 100° C. to 125° C. from chamber 3a to pass over the apples. This displaces the cooler fat already covering the fruit, and increases the rate of evaporation sufficiently to inflate the apple particles by the rapid generation of vapor within the particles. Evaporation with fat is continued until the fruit is substantially dry. If fat at about 115° C. is in contact with the fruit for a period of not more than one or two minutes puffing without material decomposition of the fruit sugars takes place. Then valves 46 and 47 are closed and cooler fat is admitted to mix with other fat in the system by opening valves 48 and 56 connecting with chamber 2. Valves 48 and 56 are allowed to remain open only sufficiently long to bring the average temperature of the fat to approximately 70° C. Then valves 48 and 56 are closed, and valve 7 is opened to circulate and mix the fat in the trays. To remove a gas which may be present in chamber 2 during the time when oil is circulating through this chamber, valve 49 may be opened momentarily. The fruit is then quickly cooled by fat at 20° C. to 40° C. which is admitted to the trays by closing valve 7 and opening valves 48 and 56 to admit into line 13 the liquid in cooler 2. This liquid displaces the hot fat in the trays and cools the fruit.

After allowing several minutes for that amount of cooling to occur that is required to give the fruit structural rigidity, the cool fat may be injected into its pores and cells by slowing admitting air at normal atmospheric pressure into the processing chamber while the fat still covers the fruit. Or, if it is desired to produce air-filled fruit, this may be accomplished by stopping the circulation of cool fat, pushing upward on handle 38 to drain the fat, then when the trays are drained, slowly admitting air to the chamber by opening valve 18.

While filling the cells and pores of a food with a liquid medium, it is essential to maintain the level of the liquid over the fruit. If absorption of liquid occurs more rapidly than the liquid is supplied by spouts 27, then the level of the liquid is liable to fall below screen 31, and portions of the food become exposed to the air. These portions would then become filled with air instead of liquid. To aid in preserving the liquid level above screen 31, a suitable level indicator or sight glasses in cover 1 may be installed which will enable the operator to determine the level in each tray. The operator will then admit air by regulating valve 18 in such a manner as to increase the air pressure sufficient to drive liquid into the fruit at a rate not exceeding that at which liquid is supplied by spouts 27.

In the present invention I may utilize not only whole or relatively large cut particles of fruit, but also comminuted fruit as fruit cakes. Said comminuted fruit as fruit cakes may be rapidly dehydrated and puffed by contact with fats at reduced pressures, according to the process described above, without causing substantial decomposition of the fruit sugars. Furthermore, puffed products containing in their cells either a gas, a liquid or a solid, may be produced.

Foods may be impregnated with any of a wide variety of liquids by conducting the desired liquid into contact with the food prior to the restoration of normal pressure. Thus puffed fruits may be impregnated with aqueous syrups, with condensed milk, with melted milk chocolate, with egg albumin, gelatin solutions, or other liquids, by draining away under reduced pressure the heating or cooling liquid that may be in contact with the fruit and covering the fruit with the desired impregnating liquid prior to the restoration of normal pressure. Some such liquids will coagulate after they have been injected into the fruit to form fruit impregnated with solids. For example, the acid of the fruit causes coagulation of milk solids and of egg albumin to take place shortly after milk or egg albumin has entered the cells of the fruit. Gelatine can be made to solidify and syrups can be caused to crystallize by allowing time to elapse and by reducing the temperature after impregnation.

Full cell impregnation is not limited to foods that have been dehydrated in the manner described. It is possible by this invention to impregnate any food having a porous or cellular structure and possessing sufficient structural rigidity to prevent collapsing under pressure. For example, puffed grains may be impregnated. Fruit processed by the method of my aforementioned United States patent, namely No. 2,110,184, or other dehydrated fruits, fruit cakes or fruit powders may be evacuated of air and impregnated with fats or other liquids in the manner described in the preceding paragraphs.

It is known that dehydrated crisp fruits can be broken into particles of any desired size to produce granulated fruit and powdered fruit useful in baking. However, such products have the disadvantage that they tend to cake when stored or exposed to the atmosphere. When these products have caked, they are difficult to use in baking. To overcome this difficulty, I place such granulated or powdered fruit before caking into my new apparatus and impregnate them with a fat such as melted hydrogenated cottonseed oil. Thus protected, the mass of fruit is not susceptible to caking, and the resulting product can be mixed with flour in a manner similar to that used for ordinary shortening. Grain flour may be similarly impregnated with a fat to produce a composition of flour and fat convenient for use in baking.

Following injection or impregnation of dehydrated foods with liquids containing water, or other solvent such as alcohol, the solvent may be removed from the food by a further heating under reduced pressure. This process of alternate injections and drying may be repeated any number of times until all of the pores and cells of the food are filled with a substance brought there through the medium of the solvent.

Many beneficial effects can be achieved. For example, rennet dissolved in a solvent may be injected into a food, the solvent may then be evaporated, and sweetened condensed skim milk or whole milk may then be injected into the food at about 25° C. to 45° C. whereupon the milk solids would be coagulated. If desired, the food may then be used, for example in ice-cream, or the food may be dried further, reinjected with rennet and the process repeated until the food is filled with milk solids.

Fat impregnated fruit is useful in baking: in breads and cakes, the fat impregnated fruit retains its shape and firmness during cooking, to a greater extent than dried fruit not impregnated.

Many modifications of the above described apparatus may be made by one skilled in the art without departing from the spirit of my invention. It is intended that the foregoing drawing and specification be construed broadly and not limited excepting as set forth in the following claims:

What I claim is:

1. In dehydrating apparatus having a closed vessel provided with a first valved outlet in the bottom for draining liquid therefrom when the outlet is open and a second valved outlet for connection with air evacuating means for creating a partial vacuum within said vessel when the said first valved outlet is closed; means for removably supporting a plurality of receptacles within said vessel, a plurality of receptacles having open upper sides respectively adapted to be substantially filled with liquid supported on said means, a conduit for hot liquid communicating with each of said receptacles for simultaneously supplying said liquid to the latter to a predetermined level in each receptacle, a screen releasably secured within each receptacle above the bottom thereof positioned for holding material within each receptacle below said level, and each of said receptacles being provided with a drain opening for draining liquid therefrom.

2. In dehydrating apparatus having a closed vessel provided with a first valved outlet in the bottom for draining liquid therefrom when the outlet is open and a second valved outlet for connection with an evacuating means for creating a partial vacuum within said vessel when said first valved outlet is closed; means for removably supporting a plurality of receptacles having open upper sides respectively removably supported on said means each adapted to hold liquid therein to a predetermined level upon such liquid being constantly fed thereto, a conduit for hot liquid communicating with each of said receptacles for simultaneously supplying said liquid to the latter to a predetermined level in each receptacle, a pair of vertically spaced horizontal screens in each of said receptacles positioned for holding material therebetween below said level, each of said receptacles having a drain opening formed therein below the lowermost screen of each pair for draining said liquid therefrom.

3. Dehydrating apparatus comprising in combination, a vessel provided with a first valved outlet in the bottom for withdrawal of liquid therefrom when said outlet is open, a second outlet for air within said container and evacuating means communicating therewith for effecting a partial vacuum within said vessel when said first outlet is closed, receptacles within said vessel for holding liquid and material to be treated immersed within such liquid with the upper surface of such liquid exposed to the effect of said partial vacuum, a valved drain opening formed in each receptacle for draining liquid therein into the bottom of said vessel, a pair of separate containers for liquid and separate heat transfer means including control means respectively associated with said containers for maintaining the liquid in said containers at different temperatures, a manifold, valved conduits connecting said containers with said manifold for selectively passing liquid from either of said containers into said manifold, and separate conduits respectively communicating between said manifold and said receptacles for feeding liquid from one or the other of said containers to said receptacles simultaneously.

4. Dehydrating apparatus comprising in combination, a vessel provided with a first valved outlet in the bottom for withdrawal of liquid therefrom when said outlet is open, a second outlet for air within said container and evacuating means communicating therewith for effecting a partial vacuum within said vessel when said first outlet is closed, receptacles within said vessel for holding liquid and material to be treated immersed within such liquid with the upper surface of such liquid exposed to the effect of said partial vacuum, a valved drain opening formed in each receptacle for draining liquid therein into the bottom of said vessel, a pair of separate containers for liquid and separate heat transfer means including control means respectively associated with said containers for maintaining the liquid in said containers at different temperatures, a manifold, valved conduits connecting said containers with said manifold for selectively passing liquid from either of said containers into said manifold, and separate conduits respectively communicating between said manifold and said receptacles for feeding liquid from one or the other of said containers to said receptacles simultaneously, the heat transfer means associated with one of said containers being a heating element and the heat transfer means associated with the other of said containers by a refrigeration element whereby the liquid within one container will be heated and the liquid within the other container will be cooled.

WELLS ALAN WEBB.

REFERENCES CITED

The following references are of record in the file of this patent:

UNITED STATES PATENTS

| Number | Name | Date |
|---|---|---|
| 1,861,307 | Gernhardt | May 31, 1932 |
| 2,344,151 | Kasser | Mar. 14, 1944 |

FOREIGN PATENTS

| Number | Country | Date |
|---|---|---|
| 273,203 | Italy | Mar. 31, 1930 |